United States Patent [19]
Albin et al.

[11] Patent Number: 6,072,922
[45] Date of Patent: Jun. 6, 2000

[54] CRYOGENIC FIBER OPTIC TEMPERATURE SENSOR

[75] Inventors: Sacharia Albin, Virginia Beach; Jianli Zheng, Norfolk; Arnel Lavarias, Virginia Beach, all of Va.

[73] Assignee: Science and Engineering Applications Company, Inc., Virginia Beach, Va.

[21] Appl. No.: 09/100,072

[22] Filed: Jun. 19, 1998

[51] Int. Cl.⁷ .................................................. G02B 6/00
[52] U.S. Cl. .............................................................. 385/12
[58] Field of Search ...................... 385/12–14, 139–142, 385/147, 37; 250/227.17; 422/82.05; 372/6; 356/350, 32

[56] References Cited

U.S. PATENT DOCUMENTS

| | | | |
|---|---|---|---|
| 4,915,503 | 4/1990 | Pavlath ..................................... | 356/350 |
| 4,984,863 | 1/1991 | Parriaux et al. ........................... | 385/12 |
| 5,425,039 | 6/1995 | Hsu et al. .................................. | 372/6 |
| 5,770,155 | 11/1998 | Dunphy et al. ....................... | 422/82.05 |
| 5,841,131 | 11/1998 | Schroeder et al. .................. | 250/227.17 |
| 5,881,199 | 3/1999 | Li ........................................... | 385/140 |

OTHER PUBLICATIONS

G.K. White, "Thermal Expansion of Reference Materials: Copper, Silica and Silicon", *J. Phys. D: Appl. Phys.*, vol. 6, 1973, pp. 2070–2078, Printed in Great Britian.

W.W. Morey, G. Meltz, and W.H. Glenn, "Fiber Optic Bragg Grating Sensors", SPIE vol. 1169 Fiber Optic and Laser Sensors VII, 1989, pp. 98–107.

G. Meltz, W.W. Morey and W.H. Glenn, "Formation of Bragg Gratings in Optical Fibers by a Transverse Holographic Method". *Optical Letters*, vol. 14, No. 15, Aug. 1, 1989, pp.– 823–825.

A.D. Kersey, T.A. Berkoff and W.W. Morey, "High–Resolution Fiber Grating Based Strain Sensor with Interferometric Wavelength– Shift Detection", *Electronic Letters*, vol. 28, No. 3, Jan. 30th, 1992, pp. 236–238.

J.D. Prohaska, E. Snitzer, B. Chen, M.H. Maher, E.G. Nawy, and W.W. Morey, "Fiber Optic Bragg Grating Strain Sensor in Large Scale Concrete Structures" SPIE vol. 1798 Fiber Optic Smart Structures and Skins V, 1992, pp. 286–294.

W.W. Morey, Gary A. Ball and G. Meltz, "Photoinduced Bragg Gratings in Optical Fibers", *Optics or Photonics News*, vol. 5. No. 2, Feb., 1994, pp. 8–14, Optical Society of America, Washington, D.C.

S. Gupta, T. Mizunami, T. Yamao, and T. Shimomura, "Fiber Bragg Grating Cryogenic Temperature Sensors", *Applied Optics*, vol. 35, No. 25, Sep. 1, 1996, pp. 5202–5205.

M. Froggatt, "Distruted Measurement of the Complex Modulation of a Photoinduced Bragg Grating in an Optical Fiber", *Applied Optics*, vol. 35, No. 25, Sep. 1, 1996, pp. 5162–5164.

L.A. Ferreira, J.L. Santos, and F. Farahi, "Pseudoheterodyne Demodulation Technique for Fiber Bragg Grating Sensors Using Two Matched Gratings" *I EEE Phototonics Technology Letters*, vol. 9, No. 4 Apr. 1997, pp. 487–489.

*Primary Examiner*—Akm E. Ullah
*Attorney, Agent, or Firm*—John F. Carroll, Jr.; Kimberly A. Chasteen

[57] ABSTRACT

Because the thermal expansion coefficient ("TEC") of glass is small-to-negligible at low temperatures, traditional fiber Bragg grating ("FBG") sensors and long period grating ("LPG") sensors are not adequately sensitive to accurately measure cryogenic temperature changes. However, as demonstrated herein, the integration of a coating around an optical fiber (the coating having a TEC that is greater than that of the fiber alone) can allow the induction of additional thermal strain in the fiber. In this light, a new sensor for cryogenic temperature measurement has been invented that mechanically amplifies temperature transduction within fiber grating sensors. The invention has the benefit of being useful for measuring non-cryogenic temperature changes as well. The thickness of the coating can be optimized.

65 Claims, 22 Drawing Sheets

FIG. 17 (top) and FIG. 18 (bottom)
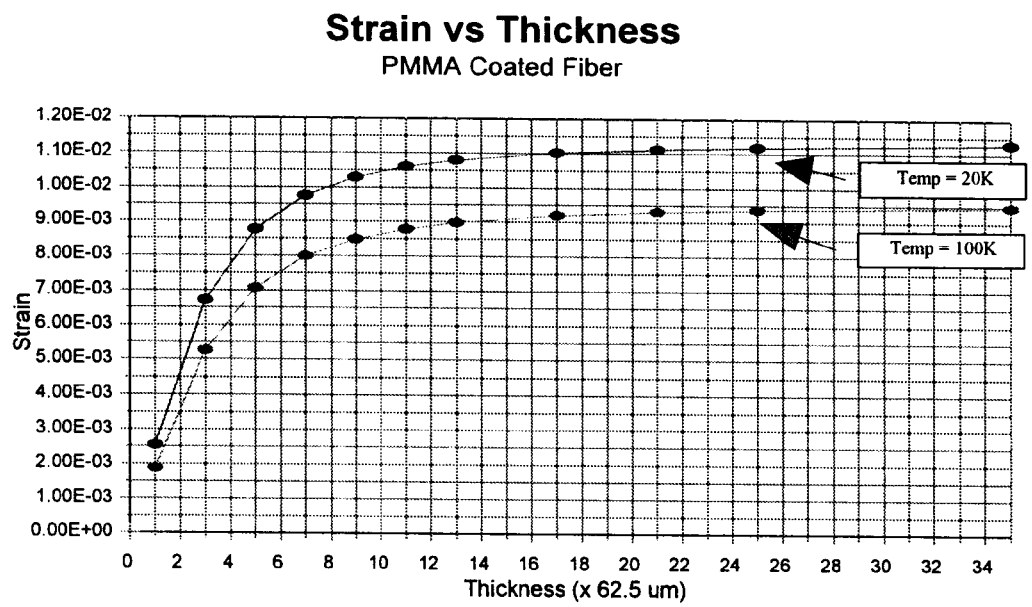
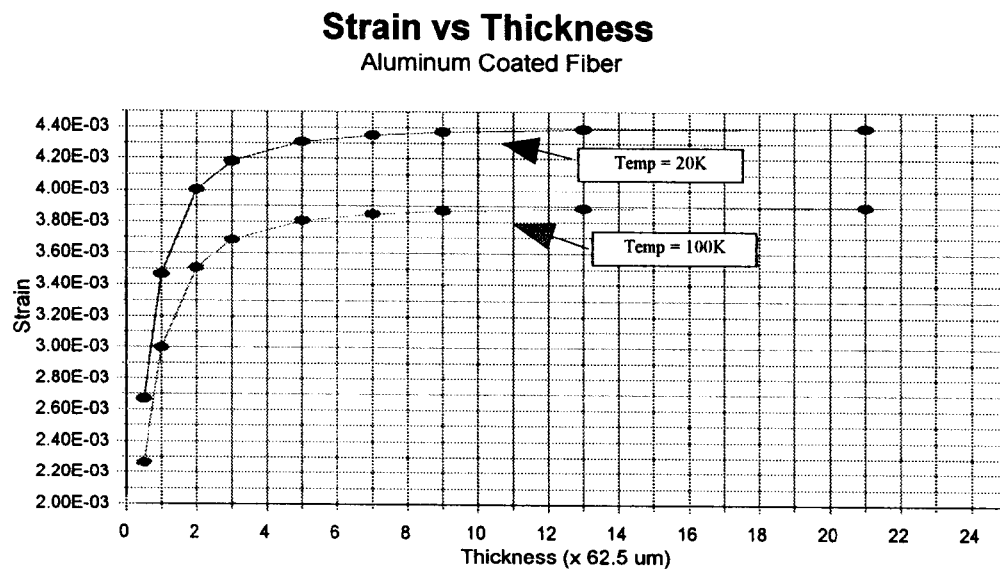

| Type of Coating | Thickness | Strain | Wavelength Shift (nm) | % Increase Thickness | % Increase Strain | % Increase Wavelength Shift |
|---|---|---|---|---|---|---|
| PMMA | 812.5 | 1.0792E-02 | -14.76 | 169.23 % | 4.68 % | 2.51 % |
|  | 2187.5 | 1.1297E-02 | -15.3 |  |  |  |
| Aluminum | 187.5 | 4.1821E-03 | -6.55 | 600.00 % | 5.26 % | 3.97 % |
|  | 1312.5 | 4.4019E-03 | -6.81 |  |  |  |

FIG. 19

CRYOGENIC FIBER OPTIC TEMPERATURE SENSOR

BACKGROUND

An optical fiber sensor has been invented that sensitively detects temperature changes, particularly cryogenic temperature changes. Specifically, the invention is a specially-designed temperature sensor that utilizes a fiber grating in conjunction with an integrated, localized fiber coating to measure temperatures as low as about ten Kelvin (10 K), or below.

Silica, of which optical fibers are often constructed, predictably expands and contracts when exposed to temperature changes. Fiber optic sensors have been fabricated that take advantage of this predictable behavior, as well as the foreseeable results of thermally-induced optical changes in silica, in order to transduce changes in temperature into meaningful signals. However, silica fibers have a very small, almost negligible, thermal expansion coefficient ("TEC") below about one hundred and fifty Kelvin (150 K). Because thermal expansion and contraction is the primary mechanism for inducing signal changes in fiber optic thermo-transducers, traditionally-crafted optical fiber Bragg grating ("FBG") temperature sensors inherently lack sensitivity, and thus their ability to be useful in broad temperature ranges is impaired, particularly at cryogenic temperatures.

In the past, fiber grating transducers have been used for sensing applications in which temperature changes occur along with a change in some other physical phenomena, such as strain. In these applications, however, a signal alteration caused by a temperature change is indistinguishable from an alteration caused by some other physical phenomena. This lack of discernment limits the utility of such devices.

As a result, there is a need for a fiber optic transducer that allows temperature-referenced measurement of physical phenomena. Additionally, there is a need for an invention that allows sensitive measurement of low temperature in the presence of strong electromagnetic fields and in explosive environments. Additionally, there is a need for an invention that allows detection of low temperature changes, as well as temperature changes across a distributed area. Moreover, there is a need for an optical fiber invention for cryogenic temperature measurement that is very accurate, easy to calibrate and use, and allows the fiber to remain flexible.

SUMMARY

An optical fiber temperature transducer has been invented. The transducer has a grating associated with the core of the optical fiber at a location along the length of the optical fiber. The grating is for selectively altering portions of the signal carried by the optical fiber. The transducer also has a coating integrated with the cladding at the location of the grating. The coating is for increasing the sensitivity of the transducer to changes in temperature at the location. The coating has a thermal expansion coefficient that is larger than the thermal expansion coefficient of the optical fiber. The optical fiber temperature transducer can have a grating that is a long period grating or a Bragg grating. The coating can be a material with a thermal expansion coefficient greater than that of the optical fiber, such as aluminum ("Al") (which can be integrated with the fiber, for example, through sputter depositing) or polymethyl methacrylate ("PMMA") (which can be integrated as a coating, for example, by polymerization). The grating can be at the end of the optical fiber.

In addition, the invention is a temperature-referenced, chemical-monitoring transducer having a chemical-monitor sensor (for detecting changes in the refractive index of a chemical), and a temperature-reference sensor (for providing signal regarding temperature changes associated with the chemical). The chemical-monitor sensor has a first optical fiber. The first optical fiber is for carrying a first optical signal. The first optical fiber is for transmitting a first signal and has a first grating associated with the core at its end. The first optical fiber also has a total internal reflection reducer. The total internal reflection reducer is for reducing the amount of first signal subject to total internal reflection within the core of the first optical fiber. The temperature-reference sensor has a second optical fiber. The second optical fiber is for carrying a second optical signal and has a second grating associated with its core at some position along its length. The second optical fiber also has a coating integrated with the cladding at the location. The coating is for increasing the sensitivity of the temperature-reference sensor to changes in temperature at the location. The coating has a thermal expansion coefficient that is larger than the thermal expansion coefficient of the second optical fiber. Consequently, when the chemical-monitoring sensor and the temperature-reference sensor are in proximity to each other and when the chemical-monitoring sensor and the temperature-reference sensor are in the presence of the chemical, changes in refractive index of the chemical can cause a change in the first signal which is compensable by a change in the second signal.

The gratings of the temperature-referenced, chemical-monitoring transducer can be Bragg gratings. The coating can be a material with a thermal expansion coefficient greater than that of the optical fiber, such as aluminum (which can be integrated with the fiber, for example, through sputter depositing) or polymethyl methacrylate (which can be integrated as a coating, for example, by polymerization). The grating can be at the end of the optical fiber. The first fiber and the second fiber can be the same fiber. Several of these sensor pairs can be distributed on the same fiber to allow for distributed measurement. The wavelength manipulated by each grating associated with each such distributed sensor can be different to distinguish changes at different locations. The total internal reflection reducer can be a decreased thickness of the cladding of the first optical fiber at the location, relative to the thickness elsewhere in the cladding. The cladding thickness can be decreased by etching with hydrofluoric acid. The total internal reflection reducer can be an increased index of refraction of the cladding of the first optical fiber at the location, relative to the index of refraction elsewhere in the cladding of the first optical fiber. The total internal reflection reducer can be a decreased index of refraction of the core of the first optical fiber at the location, relative to the index of refraction elsewhere in the core of the first optical fiber. The transducer can be used as any one of a number of chemical monitoring sensors, such as a level sensor, a depth sensor and a fluid density sensor.

The invention is also a process for making an optical fiber temperature transducer. The process has the steps of associating a grating with the core of the optical fiber at a location along the length of the optical fiber (where the grating is for selectively altering portions of the signal carried by the optical fiber) and integrating a coating with the cladding at the location (where the coating is for increasing the sensitivity of the transducer to changes in temperature at the location). The coating has a thermal expansion coefficient that is larger than the thermal expansion coefficient of the optical fiber. The process can employ a grating that is a long period grating or a Bragg grating. The coating can be a material with a thermal expansion coefficient greater than that of the optical fiber, such as aluminum (which can be integrated with the fiber, for example, through sputter depositing) or polymethyl methacrylate (which can be integrated as a coating, for example, by polymerization). The grating can be at the end of the optical fiber. The invention is also a transducer made according to this process.

The invention is also a process for making a temperature-referenced, chemical-monitoring transducer that has the steps of fabricating a chemical-monitor sensor (where the chemical-monitor sensor is for detecting changes in the refractive index of a chemical) and fabricating a temperature-reference sensor (where the temperature-reference sensor is for providing a signal regarding temperature changes associated with the chemical). The chemical-monitor sensor is made according to a process that has the steps of associating a first grating with the core at the end of the first optical fiber and reducing the amount of optical signal subject to total internal reflection within the core of the first optical fiber. The temperature-reference sensor is made according to a process that has the steps of associating a second grating with the core of the second optical fiber at a location along the length of the second optical fiber and integrating a coating with the cladding at the location. The second grating is for selectively altering the second signal carried by the second optical fiber. The coating is for increasing the sensitivity of the temperature-reference sensor to changes in temperature at the location. The coating has a thermal expansion coefficient that is larger than the thermal expansion coefficient of the second optical fiber. Consequently, when the chemical-monitor sensor and the temperature-reference sensor are in proximity to each other and when the chemical-monitor sensor and the temperature-reference sensor are in the presence of the chemical, changes in refractive index of the chemical can cause a change in the first signal which will be compensable by a change in the second signal.

The gratings of process can be Bragg gratings. The coating can be a material with a thermal expansion coefficient greater than that of the optical fiber, such as aluminum (which can be integrated with the fiber, for example, through sputter depositing) or polymethyl methacrylate (which can be integrated as a coating, for example, by polymerization). The grating can be at the end of the optical fiber. The first fiber and the second fiber can be the same fiber. Several of these sensor pairs can be distributed on the same fiber to allow for distributed measurement. The wavelength manipulated by each grating associated with each such distributed sensor can be different to distinguish changes at different locations. The total internal reflection reducing step can involve decreasing the thickness of the cladding of the first optical fiber at the location, relative to the thickness elsewhere in the cladding of the first optical fiber. The cladding thickness can be decreased by etching with hydrofluoric acid. The total internal reflection reducing step can involve increasing the index of refraction of the cladding of the first optical fiber at the location, relative to the index of refraction elsewhere in the cladding of the first optical fiber. The total internal reflection reducing step can involve decreasing the index of refraction of the core of the first optical fiber at the location, relative to the index of refraction elsewhere in the core of the first optical fiber. The invention is a transducer made according to this above-described process. The transducer made in this manner can be any one of a number of chemical monitoring sensors, such as a level sensor, a depth sensor and a fluid density sensor.

DRAWINGS

The invention will be described in greater detail with reference to the accompanying drawings, where like elements bear like reference numerals and where:

FIG. 17 shows the variation in strain at different thicknesses of PMMA coating on an optical fiber at 20 K and 100 K;

FIG. 18 shows variation of strain at different thickness of Al coating on an optical fiber at 20 K and 100 K;

FIG. 19 is a chart showing expected coating thickness dependence of peak wavelength shift for a PMMA-coated FBG and an Al-coated FBG;

Figure 21:
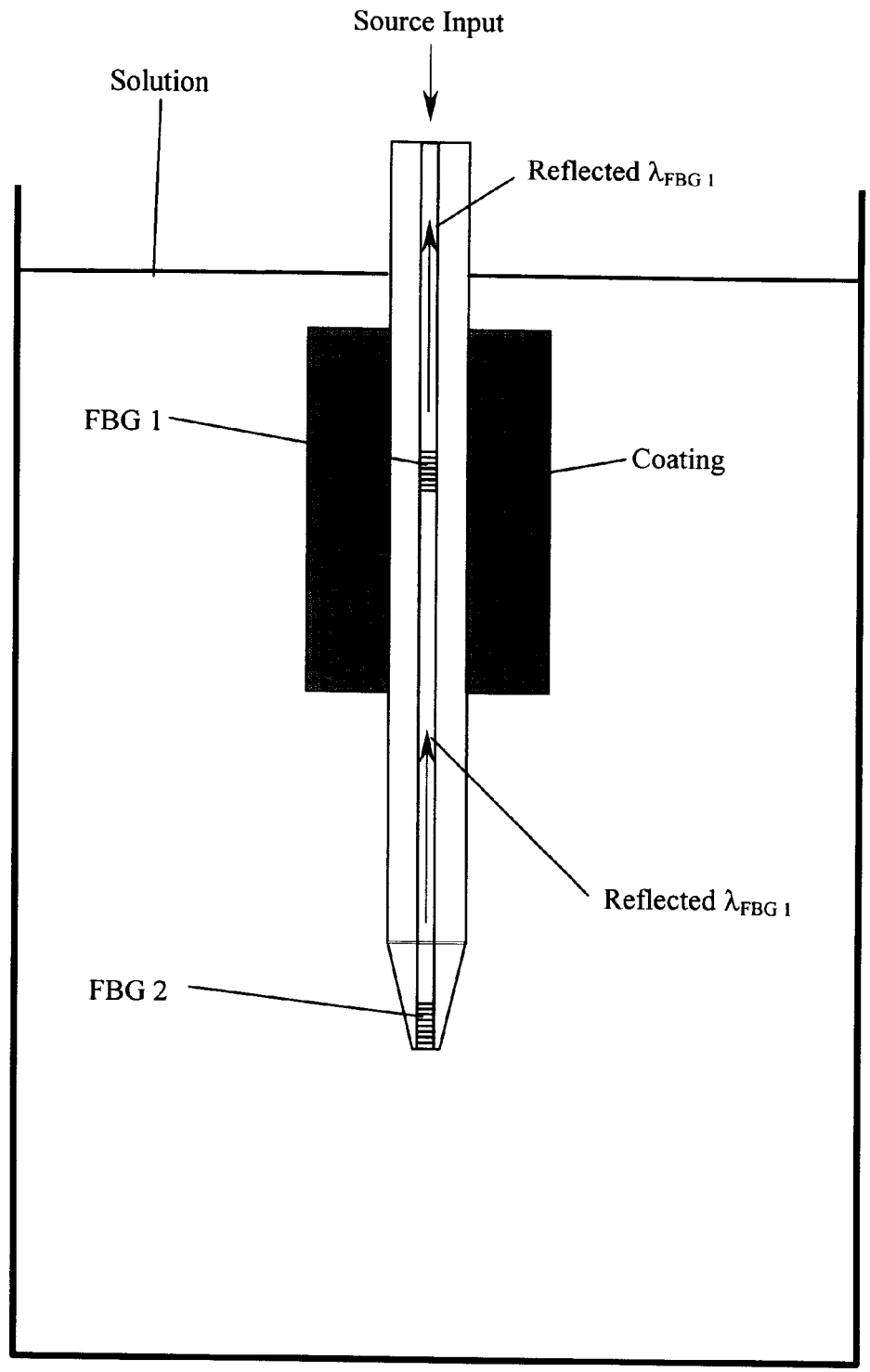
Figure 22:
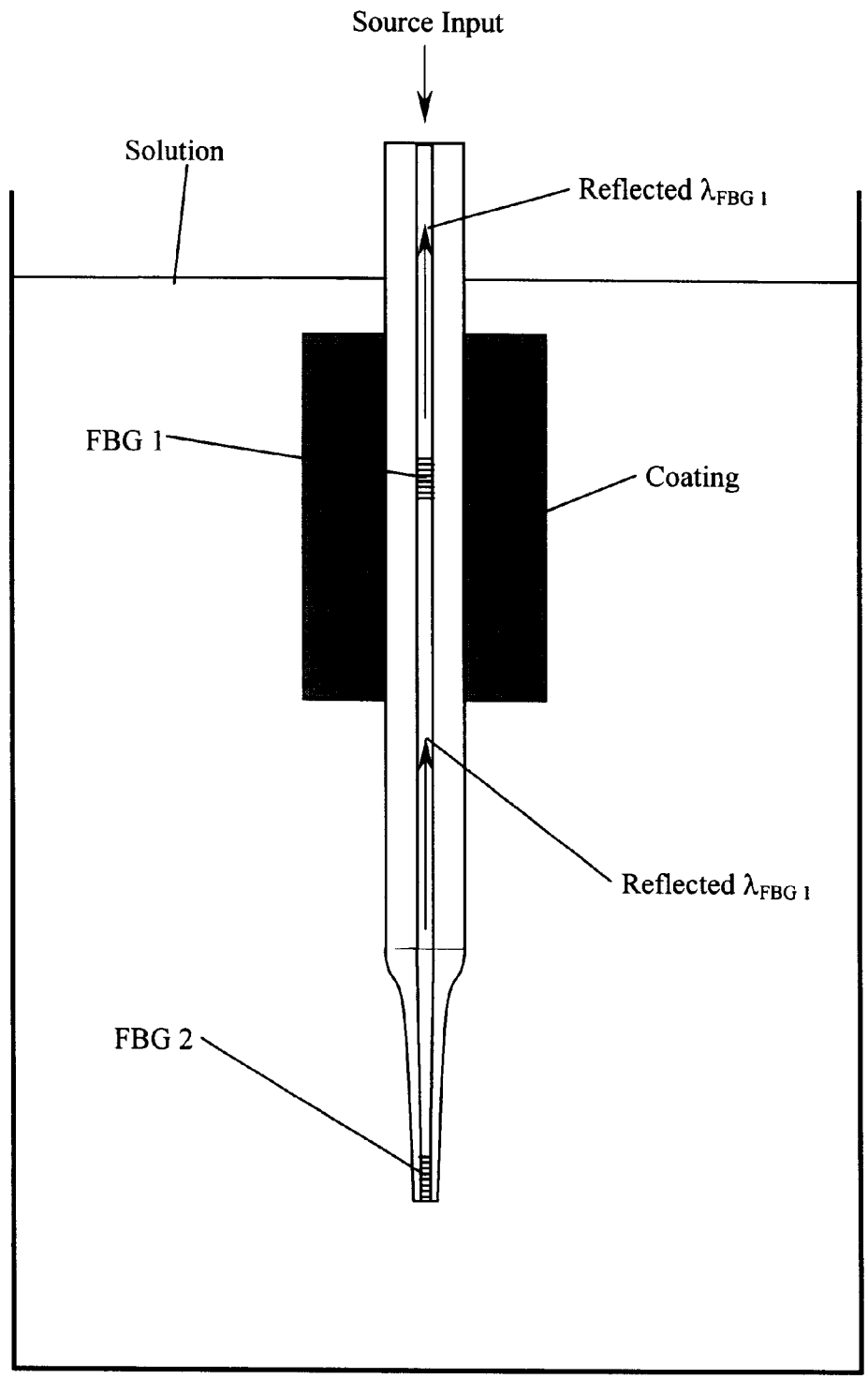
Figure 23:
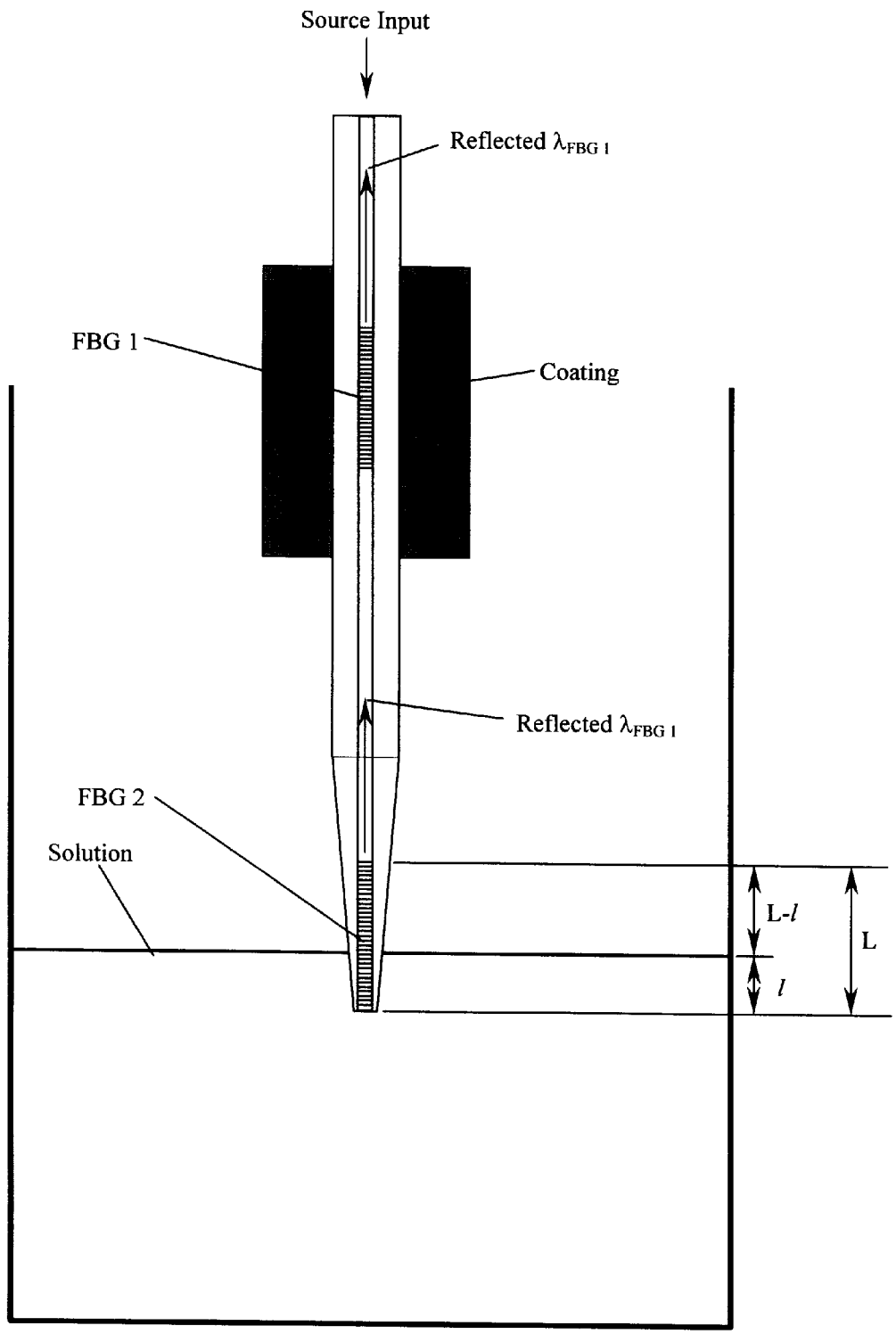

FIG. 21 schematically illustrates a sensor of the present invention used in conjunction with another fiber grating sensor having a chemically thinned cladding, that together form a temperature-referenced chemical-monitor transducer;

FIG. 22 schematically illustrates a sensor of the present invention used in conjunction with another fiber grating sensor having fused-tapered cladding, that together form a temperature referenced chemical-monitor transducer;

FIG. 23 schematically illustrates a sensor of the present invention used in conjunction with another fiber grating sensor having a thinned or tapered cladding, that together form a temperature-referenced level detector.

DESCRIPTION

Because the thermal expansion coefficient ("TEC") of glass is small-to-negligible at low temperatures, traditional fiber Bragg grating ("FBG") sensors and long period grating ("LPG") sensors are not adequately sensitive to accurately measure cryogenic temperature changes. However, as demonstrated herein, the integration of a coating on an optical fiber (the coating having a TEC that is greater than that of the fiber alone) can allow the induction of additional thermal strain in the fiber. In this light, a new sensor for cryogenic temperature measurement has been invented that mechanically amplifies temperature transduction within fiber grating sensors.

For example, a bare FBG sensor having a center Bragg wavelength of 1550 nm would be expected to demonstrate a Bragg shift of approximately 1–2 nm for a temperature drop from two hundred and seventy-three Kelvin (273 K) to ten Kelvin (10 K), with much of that shift occurring at the higher end of the temperature range. However, assuming that the same FBG sensor had been designed in accordance with the invention, the modified FBG would be expected to demonstrate a Bragg shift of from about 7 nm and about 16.5 nm (respectively, for Al- and PMMA-coated gratings) for the same temperature drop.

Although there is some attenuation of sensitivity with decreased temperature associated with the invention (as will be discussed in further detail below), much of the signal alteration capability demonstrated by the device of the present invention occurs in the lower end of the temperature range. Furthermore, the configuration of the present invention is independent of transmission or bending losses because the FBG is wavelength-encoded to detect and/or eliminate those losses not directly associated with temperature change. Moreover, the invention allows direct, as well as multi-point and quasi-distributed sensing.

Figure 14:
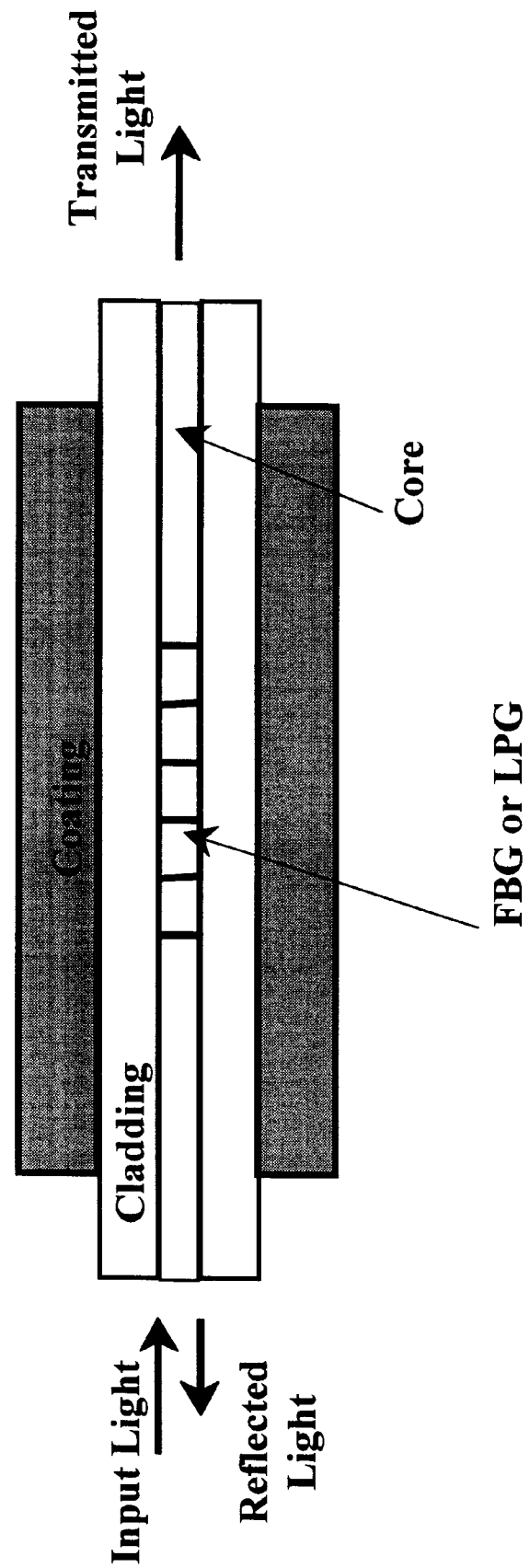
FIG. 14 shows a schematic of a coated FBG.
Figure 15:
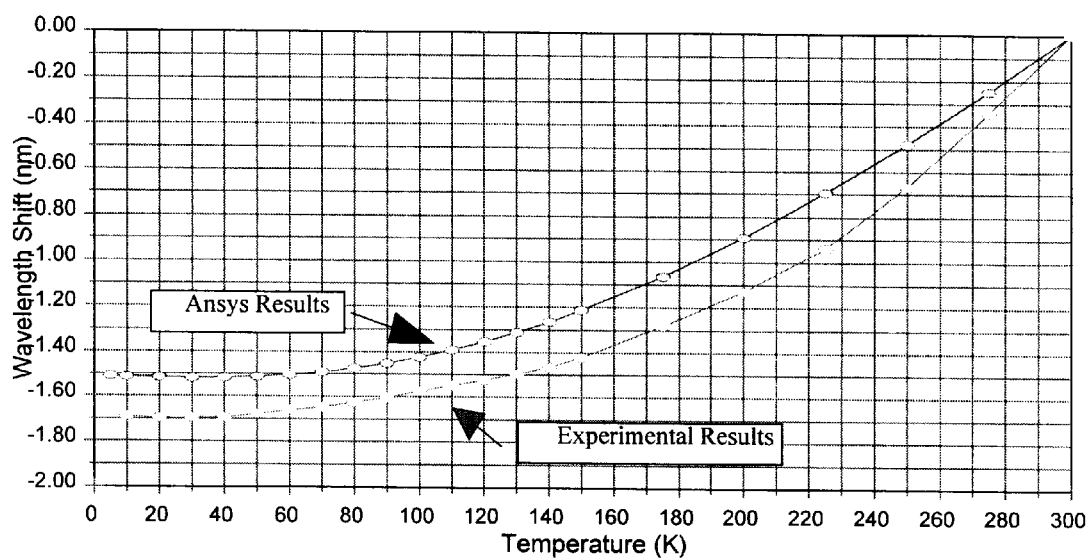
FIG. 15 shows theoretical and expected experimental wavelength shifts of an uncoated FBG at various temperatures.
Figure 16:
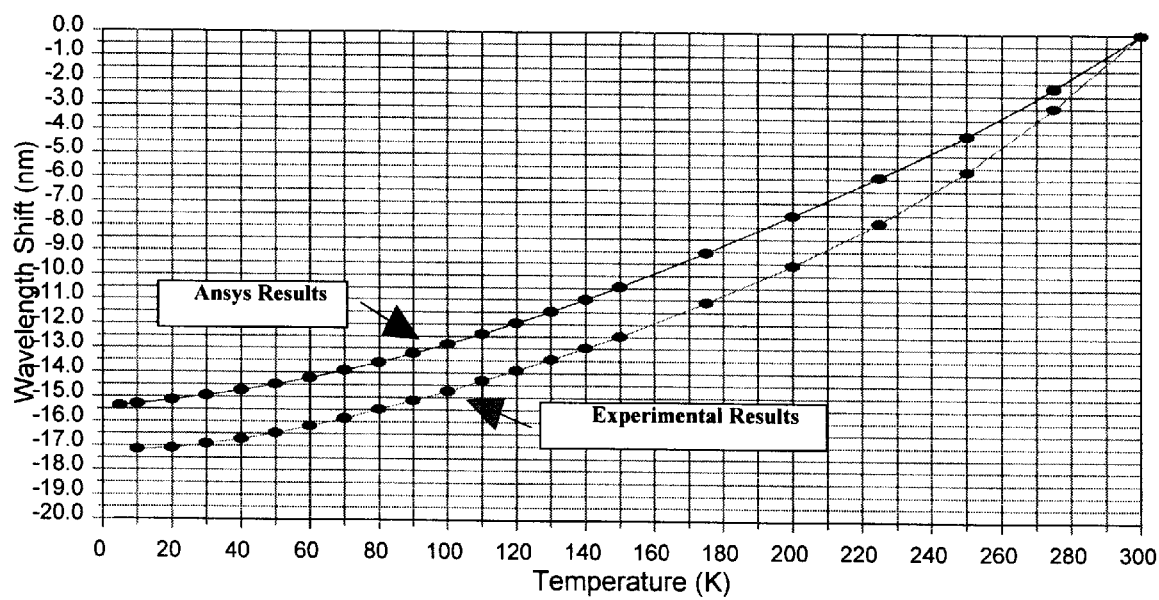
FIG. 16 shows theoretical and expected experimental wavelength shifts of a PMMA-coated FBG at various temperatures.

The present invention requires mating a fiber that has a grating, such as a Bragg grating or a long period grating, with a material that has a TEC that is greater than that of the fiber. See FIG. 14. Mating the appropriate material can be accomplished by directly integrating the selected material with the fiber through a coating process, without interference from any other adhesive or bonding agents, thereby eliminating unpredictability that can be caused by extraneous layers. When exposed to variations in temperature, the coating on the fiber induces strain in the fiber in excess of that which would be induced in the fiber without the coating. The increased strain in the fiber causes amplified changes in the grating period and index of refraction of the fiber in proportion to the changes in temperature. These amplified alterations enhance thermal transductive sensitivity of the device of the invention.

Coatings such as aluminum ("Al") and polymethyl methacrylate ("PMMA") are suitable materials for association with optical fibers of the invention because they adhere well to silica without any intervening adhesive that might disrupt the continuity and thus the predictability of performance. Additionally, Al and PMMA are suitable coating materials because their TECs are significantly larger than that of silica.

Figure 1:
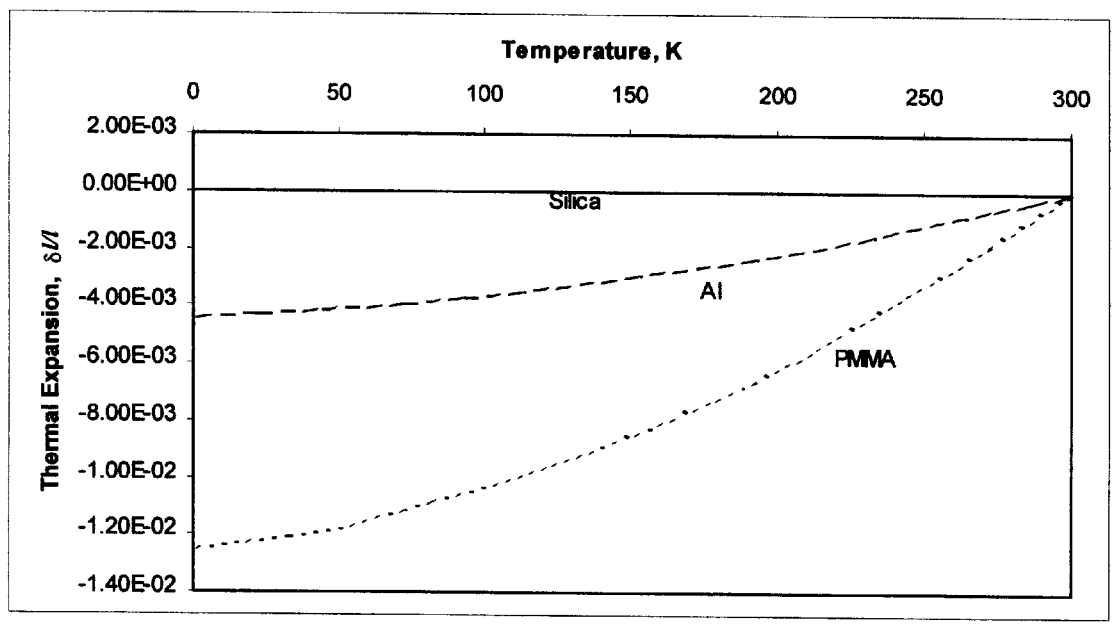
FIG. 1 shows the thermal expansion of aluminum ("Al") and polymethyl methacrylate ("PMMA") versus temperature, with the relative difference in thermal expansion of silica being shown as approximately two orders of magnitude smaller than that of Al and PMMA.
Figure 2:
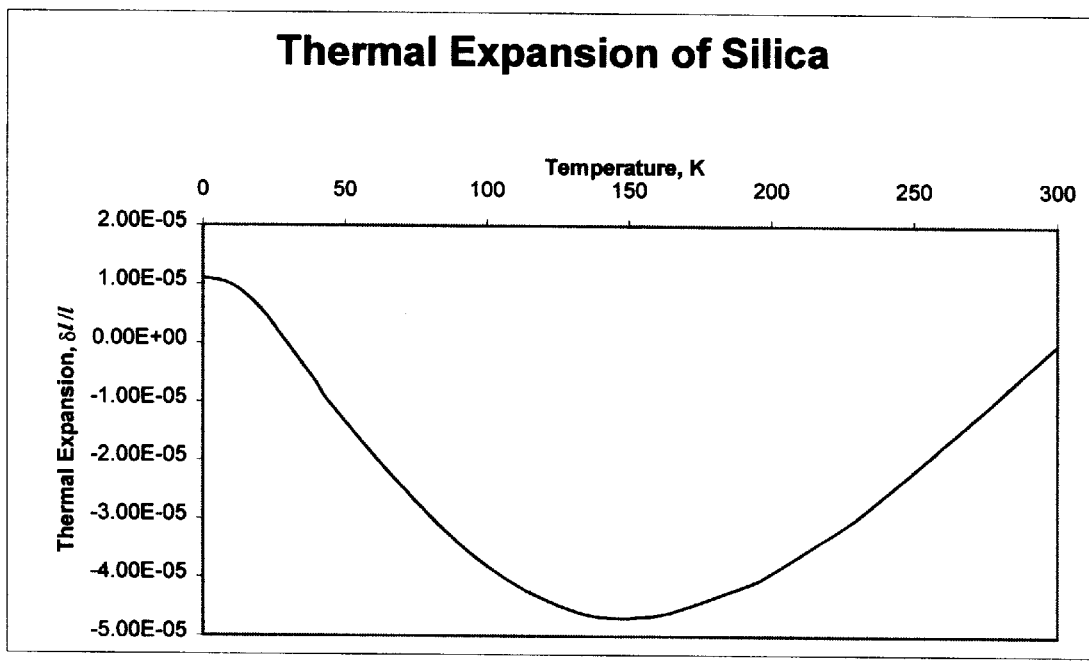
FIG. 2 shows the thermal expansion of silica versus temperature, displaying both negative and positive expansion in the temperature range of interest.

In FIG. 1, the thermal expansion of Al, PMMA, and silica are illustrated from cryogenic to room temperatures. Among metals, Al has the highest TEC, while PMMA has a TEC that is approximately twice that of Al. However, the TEC of silica is about two orders of magnitude lower than that of either Al or PMMA. As shown in FIG. 2, the thermal expansion for silica varies both negatively and positively with temperature. The minute responsiveness of silica to low temperature changes, combined with the bi-directional nature of silica in response to cryogenic temperature changes, causes silica to be unsatisfactory as the primary host of a cryogenic temperature sensor. To enhance the sensitivity of a "bare" fiber grating, a coating with a high thermal expansion coefficient is associated with the fiber to induce additional strain.

Figure 3:
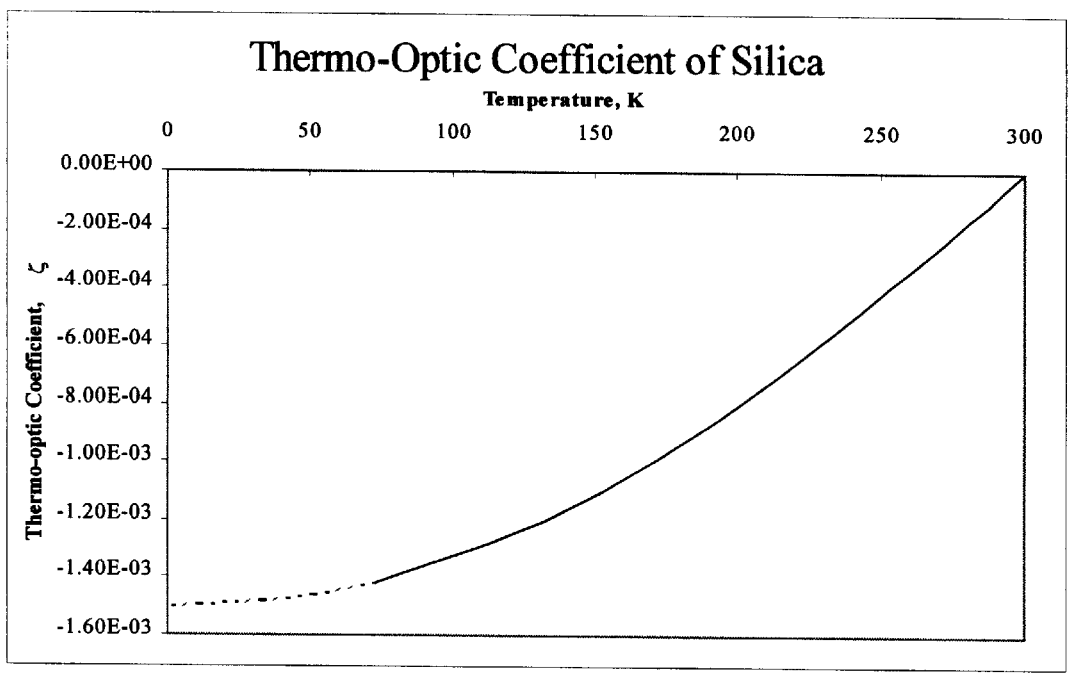
FIG. 3 shows the thermo-optic coefficient of silica, with the dotted line representing expected values of $\xi$ below 77 K.
Figure 4:
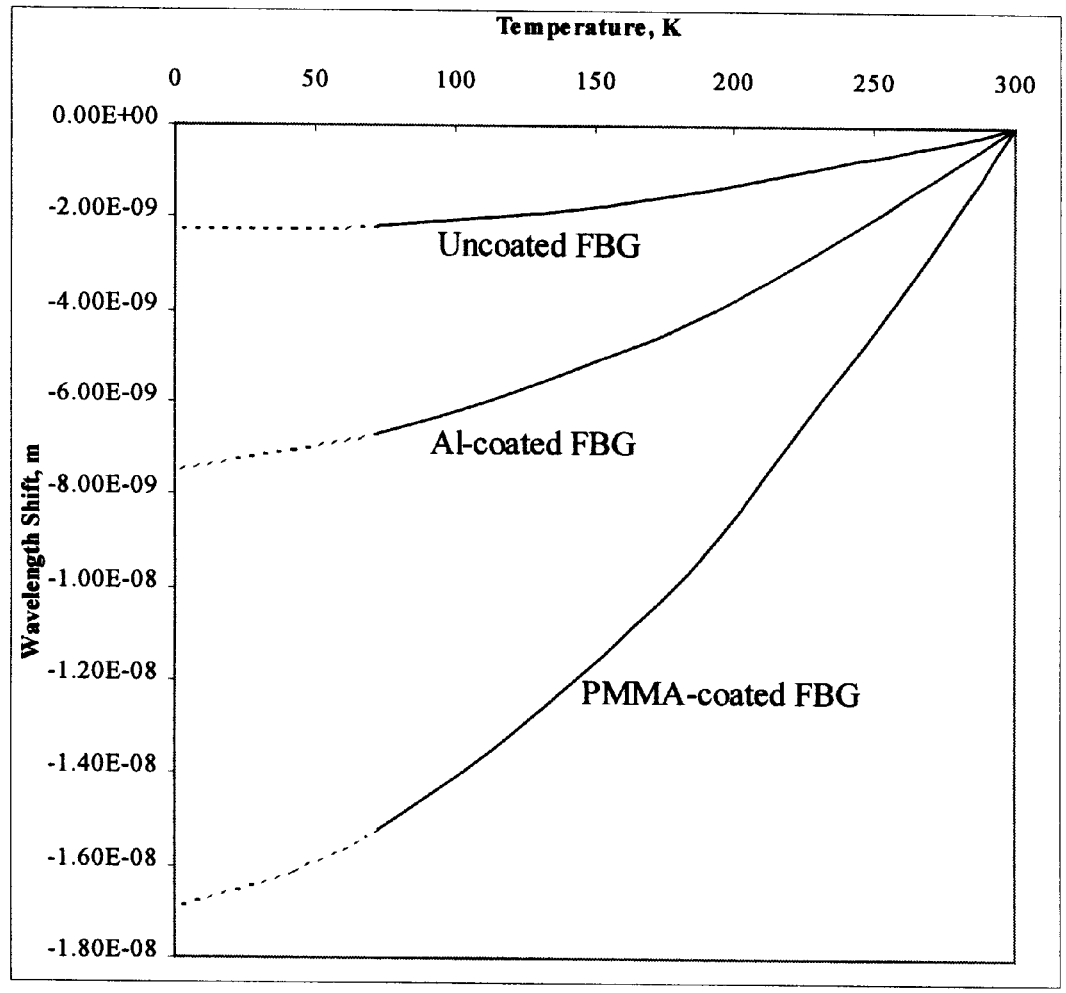
FIG. 4 shows the theoretical wavelength shift for uncoated and coated FBGs, demonstrating the temperature sensitivity of coated FBGs as being much higher than that of uncoated FBGs, with the dotted lines representing the expected value below 77 K.

To illustrate, for FBGs, the Bragg wavelength, $\lambda_B$, is given by:

$$\lambda_B = 2nd \quad (1)$$

where n is the effective refractive index of the core, and
d is the grating period.
Both n and d change with changes in temperature due to thermo-optic and thermal expansion effects. Therefore, in order to enhance the sensitivity of a fiber grating sensor, such as an FBG, a material with a high TEC can be integrally coated on the outside of the fiber. Assuming that the thermal expansion is dominated by the coating material and that the thermal expansion of silica is negligible as shown in FIG. 1, the shift in Bragg wavelength for a coated FBG is given by:

$$\frac{\Delta \lambda_B}{\lambda_B} = (1 - p_e)\frac{\Delta l}{l} + \frac{\Delta n}{n} \quad (2)$$

where $\delta n/n$ is the fractional index change,
l is the FBG length, and
$p_e$ is the photoelasticity.
Moreover, Equation No. (2) can be written in terms of temperature change $\Delta T = T - T_o$ as:

$$\frac{\Delta \lambda_B}{\lambda_B} = \int_{T_0}^{T}(1 - p_e)\alpha(T)dT + \int_{T_0}^{T}\xi(T)dT \quad (3)$$

where $\alpha(T)$ is the thermal expansion coefficient (TEC), and
$\xi(T)$ is the thermo-optic coefficient.
FIGS. 1, 2 and 3 show that $\alpha(T)$ and $\xi(T)$ are temperature-dependent and not strictly linear. Assuming that the value of $p_e$ is 0.22 and is independent of temperature, FIG. 4 shows the predicted wavelength shift $\Delta \lambda_B$ of an FBG center wavelength (e.g., approximately 1550 nm) with variations in temperature. At ten Kelvin (10 K), $\Delta \lambda_B$ is expected to be 2.2 nm for an uncoated FBG, 7 nm for an Al-coated FBG, and 16.5 nm for a PMMA-coated FBG, demonstrating that a coated FBG has higher temperature sensitivity than an uncoated FBG. As an additional benefit of the invention, the coating material will allow high temperature measurement, as well.

It is important to note that Young's modulus of the coating can have a significant effect on the strain induced on the FBG. For example, because Young's modulus for Al is smaller than that for silica, a trade-off between coating thickness and Young's modulus for the particularly selected coating material can be made in order to have the minimum coating thickness that still provides a high response.

A. Theoretical Verification

It is expected that finite element analysis software, such as that commercially available from ANSYS, Inc. of Canonsburg, Pa. would confirm the significance of the increase in sensitivity of a coated fiber grating temperature transducer. Furthermore, it is expected that such software could verify that the thickness of coated fiber gratings could be optimized.

For example, assume that a Corning SMF-28 single mode fiber with an uncoated diameter of 125 μm was modeled. The diameter of the core containing the Bragg grating can be 9 μm. The fiber coating thickness could be incremented at ½, 1, 3, and 6 times the radius of the fiber (i.e., R=62.5 μm). Strain at various temperatures could be determined as a function of thickness of the coating. The circular cross-section of the fiber could be sectioned as a quarter circle and reflected about its x- and y-axis to obtain a well-meshed full circle. Simulations could be conducted assuming that two coating materials would be used, aluminum and PMMA. The strain results could be gathered by nodal listing and by graphical contour listing.

1. Uncoated Grating

Specifically, for example, for an uncoated fiber, no coating exists that would induce external strain in the fiber. Therefore, Equation No. (2) can be simplified as follows:

$$\frac{\Delta \lambda_b}{\lambda_b} = \frac{\Delta l}{l} + \frac{\Delta n}{n} \quad (4)$$

Figure 11:
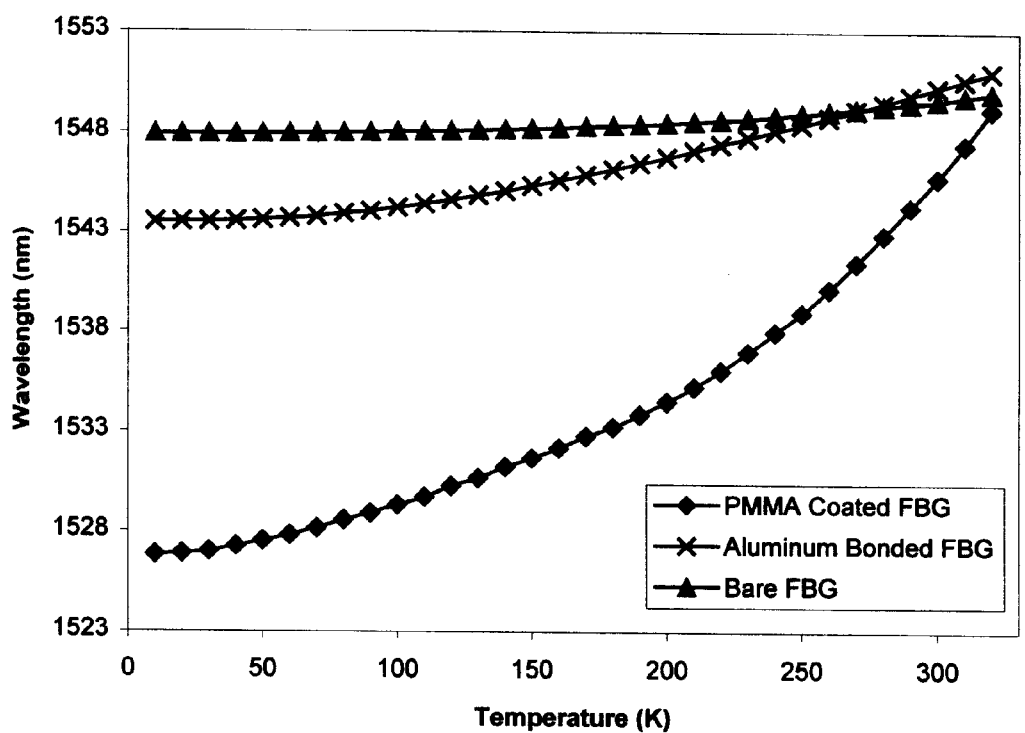
FIG. 11 shows a comparison of expected experimental peak wavelength shifts for coated and uncoated FBGs at various temperatures.

The expected shift in Bragg wavelength as a result of changes in temperature is shown in FIGS. 4 and 11.

2. Coated Gratings

In assessing the sensitivity of coated fiber gratings, above, the values of n and d of Equation No. (1) can be assumed to be temperature dependent. Expanding Equation No. (2), and taking $L_d$ as the grating period and $\Delta L_s/L_s$ as the strain in the core, the Bragg wavelength shift of a coated fiber can be described as:

$$\frac{\Delta \lambda_b}{\lambda_b} = \frac{\Delta L_d}{L_d} - P_e \frac{\Delta L_s}{L_s} + \frac{\Delta n}{n} \quad (5)$$

Figure 20:
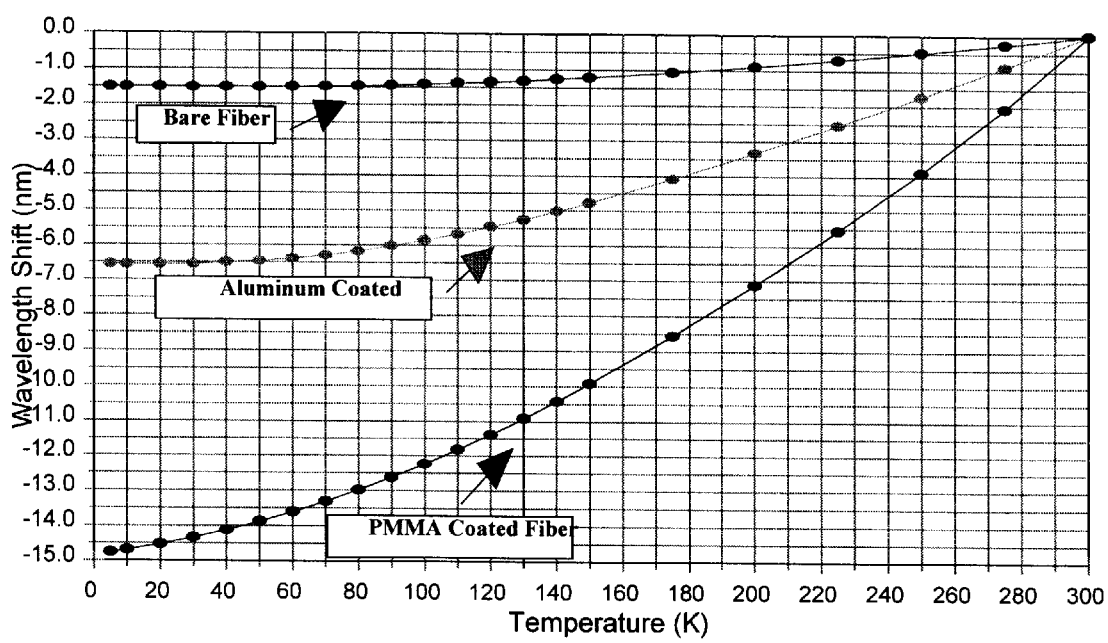
FIG. 20 shows theoretical relative peak wavelength shift for a bare FBG, an Al-coated FBG and a PMMA-coated FBG at various temperatures.

Taking $p_e$ as 0.22, and basing Young's modulus and all TECs on values appropriate at a reference temperature of three hundred Kelvin (300 K), and basing all calculations on a zero strain reference point, expected values of Bragg wavelength shift for: (a) an uncoated fiber, (b) an Al-coated fiber, and (c) a PMMA-coated fiber, can be determined for temperatures ranging from three hundred Kelvin (300 K) to five Kelvin (5 K). Furthermore, assuming the Al-coated fiber has a coating thickness of 187.5 μm, and assuming the PMMA-coated fiber has a coating thickness of 687.5 μm, the expected shifts in Bragg wavelength as a result of changes in temperature are as shown in FIG. 20.

3. Optimization of Thickness.

Figure 12:
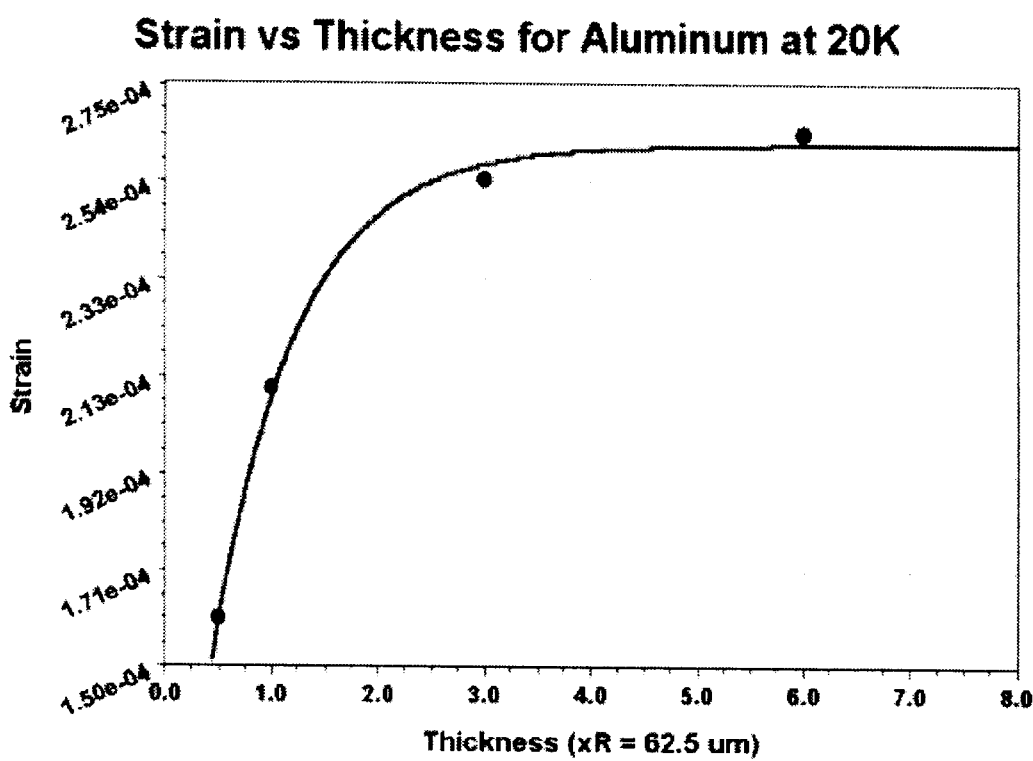
FIG. 12 shows the variation in strain at different thicknesses of an Al coating on an optical fiber at 20 K.
Figure 13:
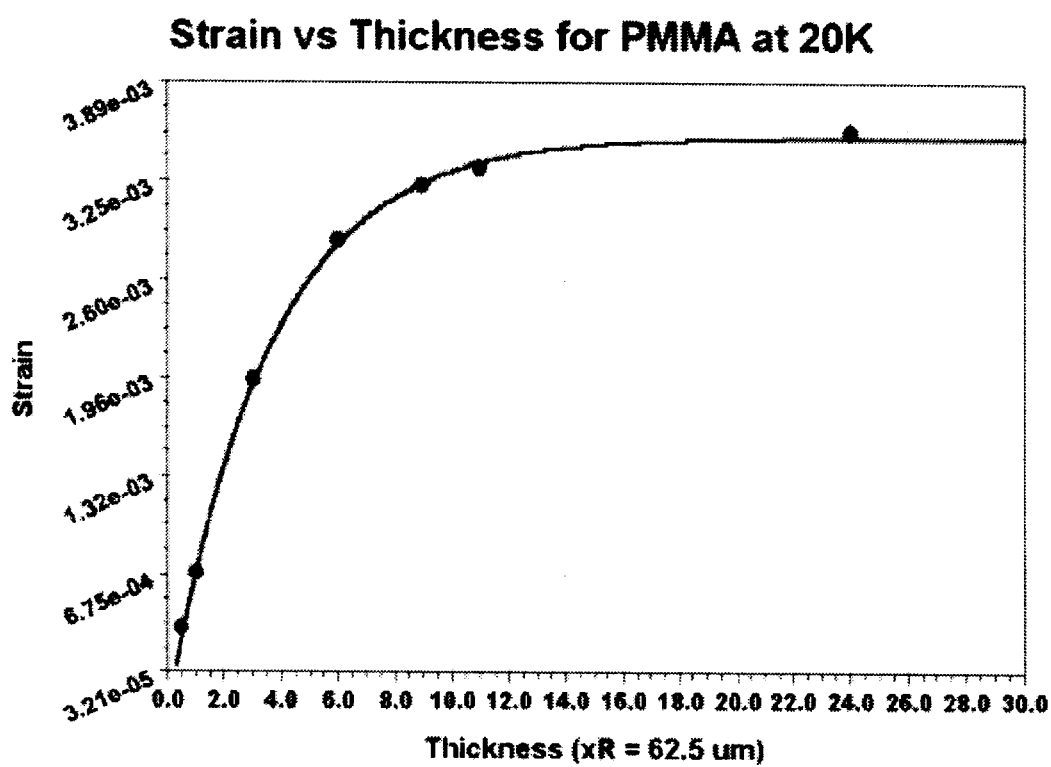
FIG. 13 shows the variation in strain at different thicknesses of PMMA coating on an optical fiber at 20 K.

Based on the analysis described above, strain data could be determined for a range of thicknesses at a particularly low temperature (i.e., a temperature that is critical and/or highly desired for cryogenic temperature measurements). If it is assumed that at twenty Kelvin (20 K) the thickness of the Al coating varies as shown in FIG. 12, it is expected that the change in strain experienced by the fiber would be that as shown in that graph. Also, if it is assumed that at twenty Kelvin (20 K) the thickness of the PMMA coating varied as shown in FIG. 13, the change in strain experienced by the fiber would be expected to be as shown in that graph as well. Both of the graphs, FIGS. 12 and 13, show that the strain in the core is expected to become saturated. Therefore, increasing the thickness past this saturation point would not be expected to improve the sensitivity of the coated fiber. The expected results could easily be repeated for other temperatures, and/or saturation levels, and similarly expected results are illustrated for strain at one hundred Kelvin (100 K). See FIGS. 12, 13, 17 and 18.

4. Summary of Theoretical Verification.

Based on the foregoing, a PMMA-coated fiber grating produces a larger wavelength shift than an Al-coated fiber. An Al-coated fiber produces a larger wavelength shift than an uncoated fiber. The larger wavelength shift per unit temperature change would be expected to correspond to higher temperature sensitivity for the device. The coating thickness is capable of being optimized.

B. Experimental Verification

1. Coating Increases Sensitivity

It is expected that the theoretical prediction could be confirmed by physical experiments. Assume the following. A grating, such as a Bragg grating or a long period grating, can be written on an optical fiber. That portion of the fiber containing the grating can then be coated with a single layer of a material that has a TEC that is greater than that of the fiber. For example, the external region of a fiber at which a grating is located can be coated with Al films by RF sputtering or electron-beam evaporation, or, alternatively, the same region of the fiber can be coated with a polymer, such as polymerized PMMA. The thickness of any such coating can be measured using standard techniques.

Figure 6:
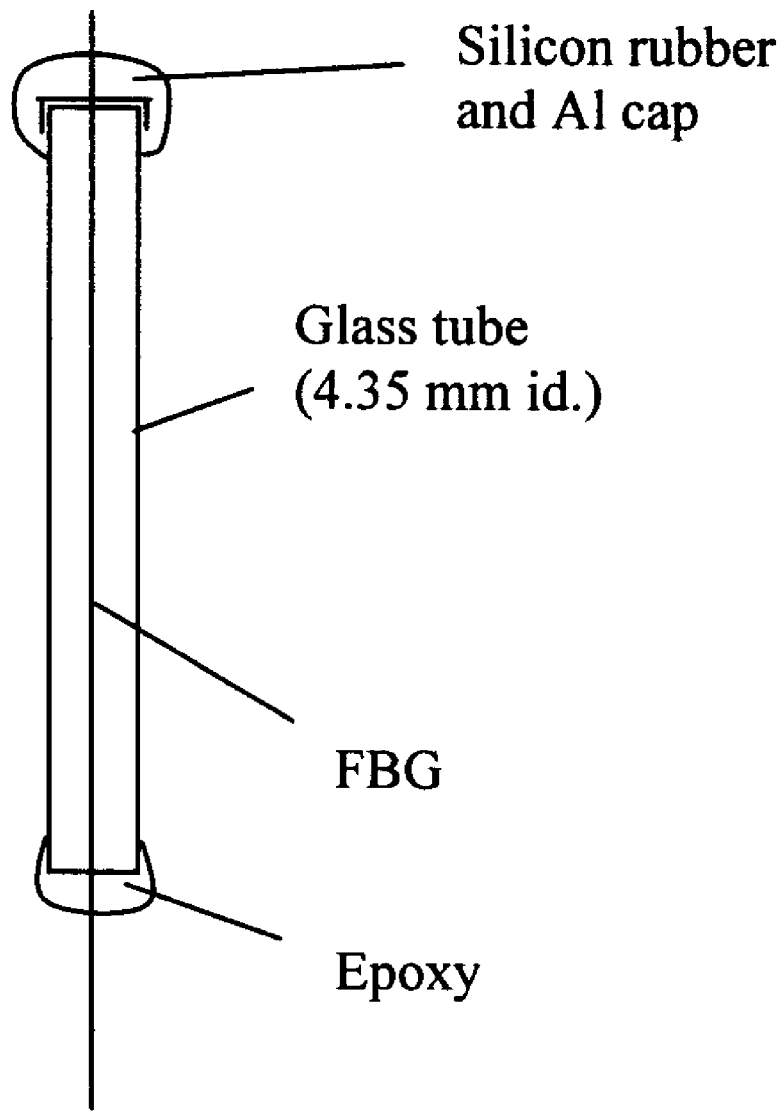
FIG. 6 shows a schematic of PMMA polymerization on an optical fiber.

The polymerization of the PMMA coating onto the fiber can occur as follows. As shown in FIG. 6, a fiber having a grating can be routed through a tube of appropriate radius. The bottom side of the tube can be sealed with epoxy. A mixture of methyl methacrylate monomer and an initiator, such as that commercially available from Monomer-Polymer & Dajac Labs, Inc. of Feasterville, Pa., and known as Vazo-64, can then be added to the tube. The top side of the tube can then be covered with an aluminum foil cap and sealed with silicon rubber. Polymerization is expected to be complete at room temperature within one week. Polymerization time can be reduced by curing at a higher temperature. After polymerization is completed, the silicon rubber, aluminum cap, and the glass tube can be removed, leaving a uniform coating of PMMA on the fiber.

Alternatively, polymerization of PMMA on a fiber having a grating can be accomplished using a solvent such as dichloromethane. Assume that two mating 1.2 mm thick PMMA blocks could be machined with the first one having a groove in which to mount that portion of the fiber having a grating. After the fiber was placed in the groove of the first PMMA block, a drop of dichloromethane can be placed in the groove, and the second PMMA block could be bonded immediately on top of the first PMMA block. Pressure can be applied to the blocks until the solvent is dried. In either of the above-described manners, multiple fibers could be polymerized with PMMA, including multiple fibers in the same mass of PMMA, such as an 819 nm FBG and a 1550 nm FBG.

Figure 5:
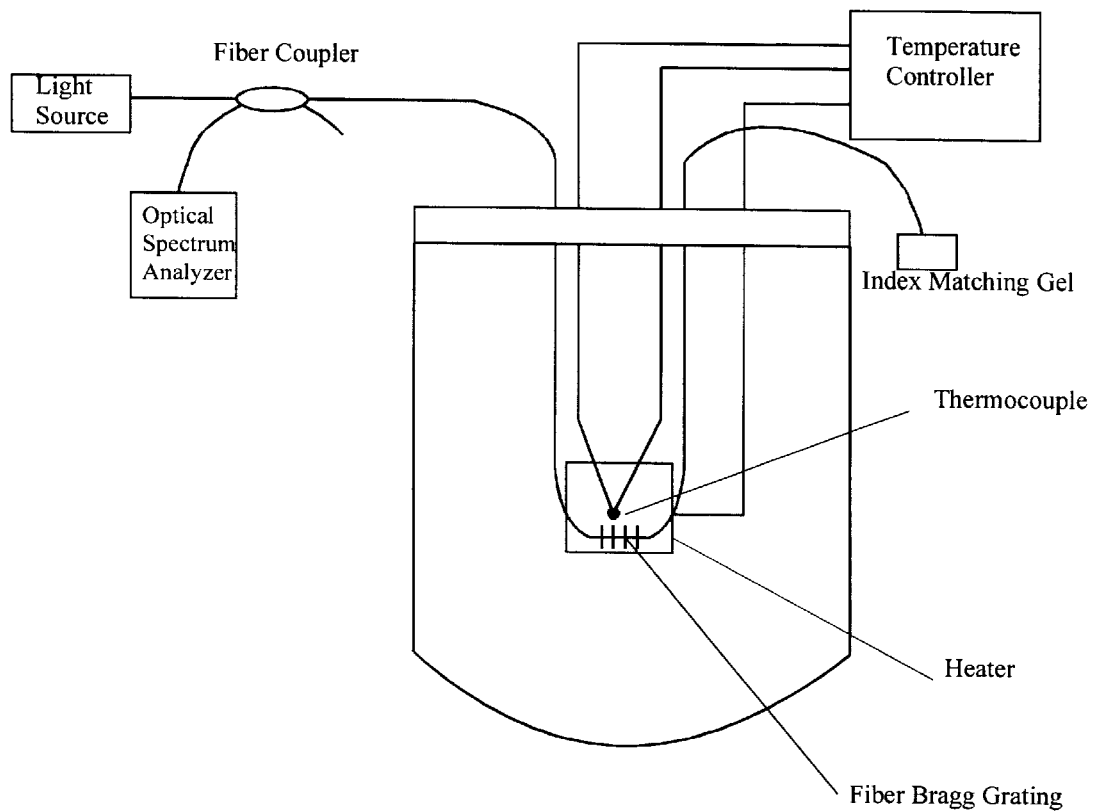
FIG. 5 shows a schematic arrangement of an experimental setup for testing transducer sensitivity.

Assume that both uncoated and coated FBGs were placed in a cryostat that has a cold head and is fitted with both a temperature controller and reference temperature sensor. The temperature controller has a thin film heater having an output of up to about fifty watts (50 W) placed on the cold head of the cryostat, the thin film heater having 'ramp-and-soak' ability that allows the heater to stabilize temperatures to within ±0.01 K. Assume that, with these enhancements, the temperature at the cold head of the cryopump could be maintained at any desired temperature in the range from about 8.1 K to about 325 K. A two-volt (2 V) diode temperature sensor can be interfaced with the temperature controller to measure temperatures at the cold head. Several copper holders can be used to attach fiber sensors to the cold head of the cryopump. Thermally conductive silicone paste could be used at all interfaces to increase thermal conductivity of the attachments and the sensors. An LED could be coupled in fiber-pigtail fashion with the optical fiber as a light source. Alternatively, a broadband light source, such as a quartz tungsten halogen lamp, could be used as the light source. A three decibel (3 dB) fiber coupler can be used to direct light signals, including reflected light, to a spectrograph. For example, an optical spectrum analyzer ("OSA") could be used to measure the reflected light spectrum. Such a setup could be similar to that as shown schematically as in FIG. 5.

Figure 7:
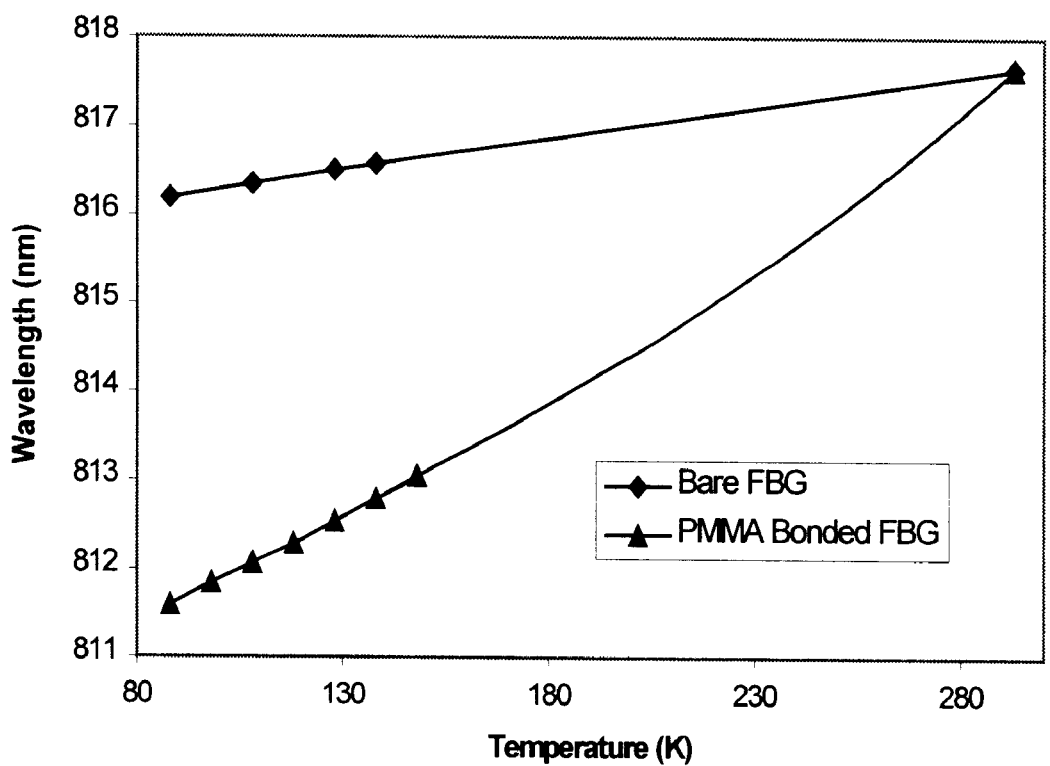
FIG. 7 shows an expected experimental peak wavelength shift for FBGs at various temperatures.
Figure 8:
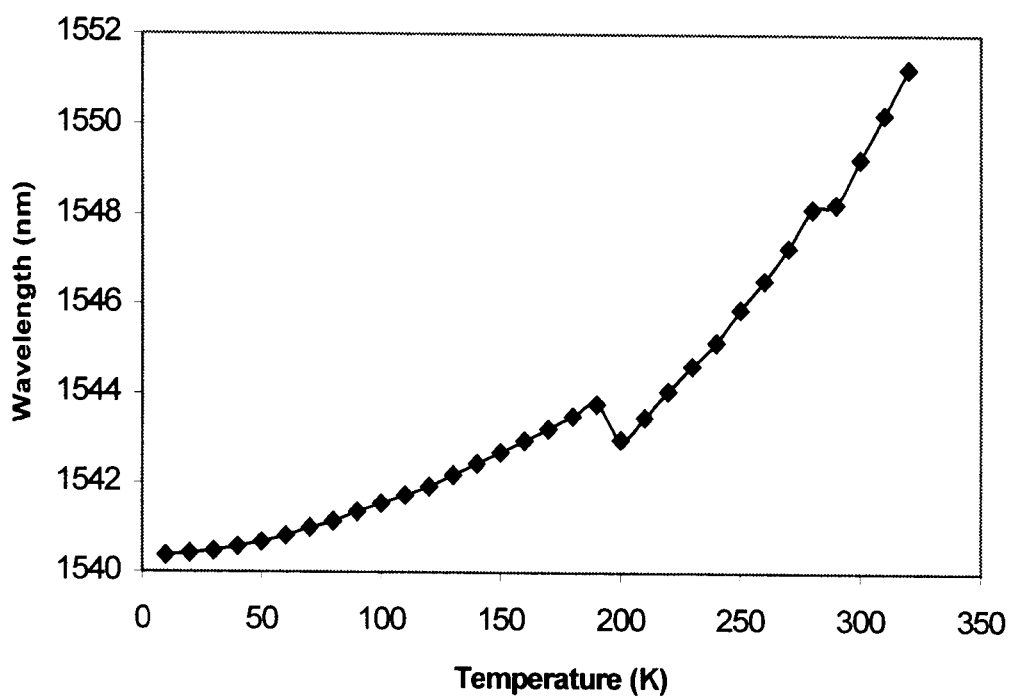
FIG. 8 shows an expected experimental peak wavelength shift for a PMMA bonded FBG for various temperatures.
Figure 9:
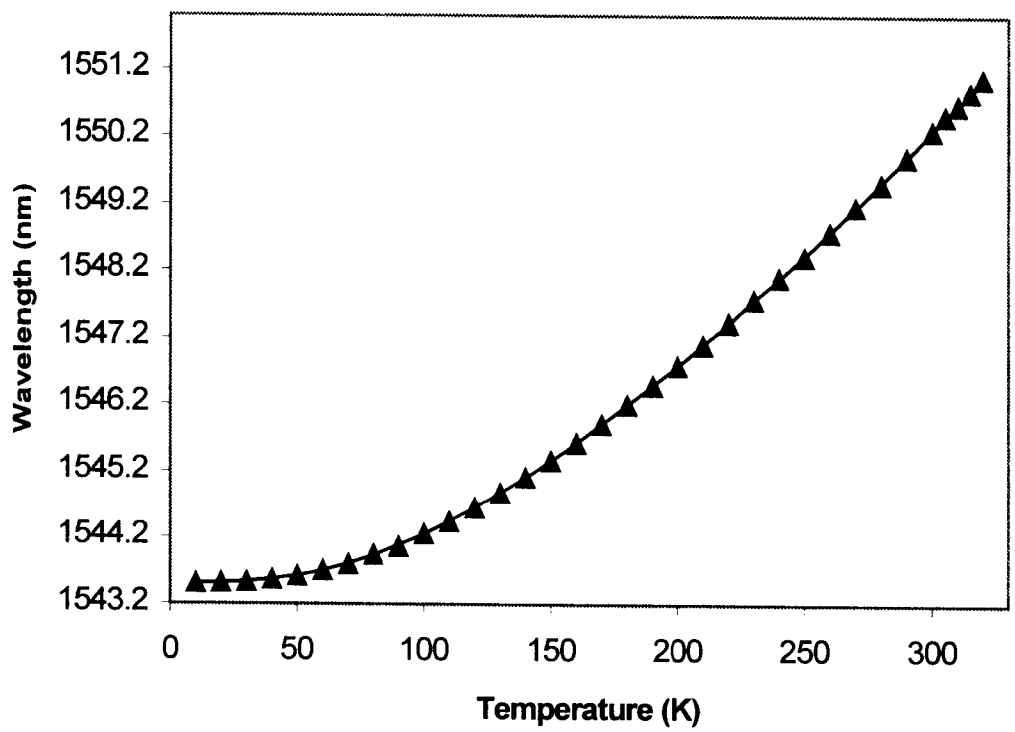
FIG. 9 shows an expected experimental peak wavelength shift for an Al bonded FBG for various temperatures.
Figure 10:
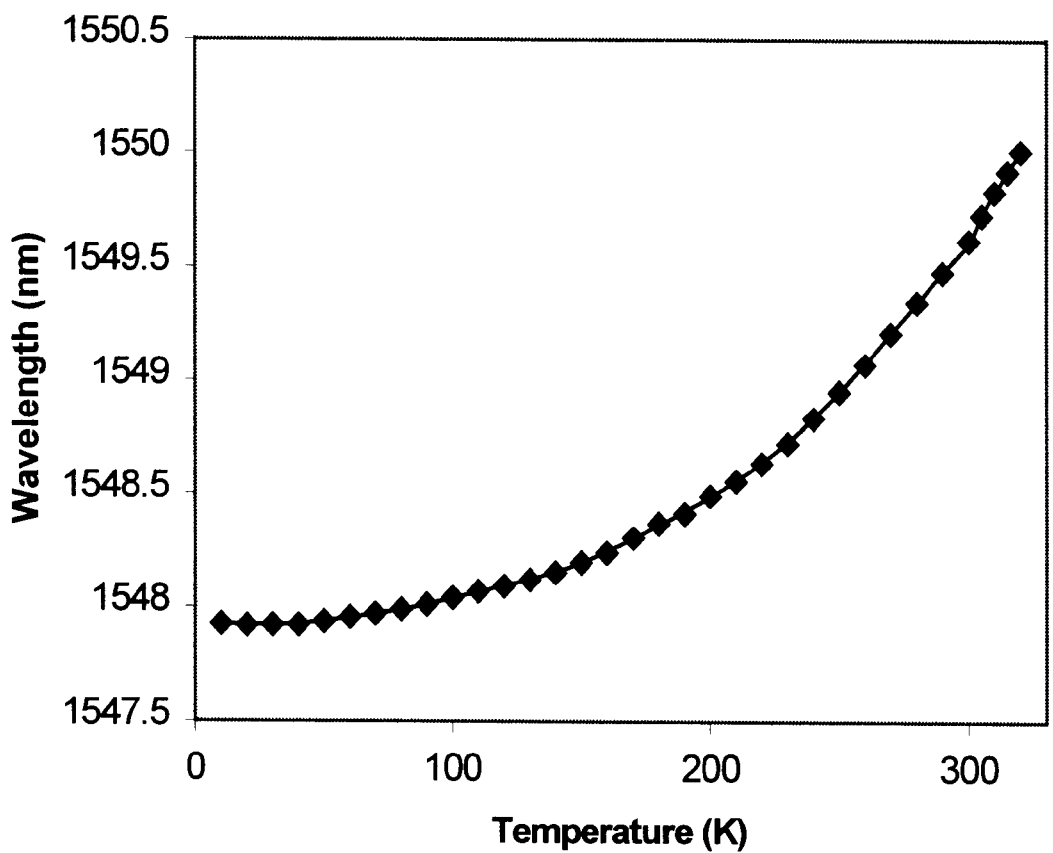
FIG. 10 shows an expected experimental peak wavelength shift for a "bare" FBG at various temperatures.

Based on the foregoing assumptions, Bragg wavelength shifts of a bare FBG, an Al-bonded FBG, and a PMMA-coated FBG at various temperatures would be expected to be as shown in FIGS. 7–11, 15, 16 and 20. Specifically, as shown in FIGS. 7, 10, 11, 15 and 20, a bare FBG (such as one having a Bragg wavelength of 819 nm) would be expected to show almost zero sensitivity at thirty Kelvin (30 K) and negative sensitivity below twenty Kelvin (20 K). Moreover, a bare FBG having a Bragg wavelength of 1550 nm would be expected to produce the Bragg shift shown in FIG. 10, where the total shift for the entire temperature range would be expected to be 2.079 nm while showing almost zero sensitivity at thirty Kelvin (30 K) and negative sensitivity below twenty Kelvin (20 K). As shown in FIGS. 9, 11 and 20, an FBG with a bonded Al coating would be expected to produce a total Bragg wavelength shift of approximately 7.555 nm from ten Kelvin (10 K) to three hundred and twenty Kelvin (320 K). The sensitivity at twenty Kelvin (20 K) would be expected to be about 1.25 pm/K.

FIGS. 7, 8, 11, 16 and 20 show the expected Bragg wavelength shift of a PMMA-coated fiber. FIG. 7 shows the expected shift for the same FBG both before and after PMMA bonding. An obvious enhancement in transducer sensitivity would be expected for the PMMA-bonded FBG, with a total peak wavelength shift of 6.052 nm compared to a shift of 1.463 nm for a bare FBG within the temperature range from eighty-eight Kelvin (88 K) to two hundred and seventy-three Kelvin (273 K). FIG. 11 shows that the total Bragg shift for a similar PMMA-coated FBG would be expected to be 22.352 nm following a temperature change from ten Kelvin (10 K) to three hundred and twenty Kelvin (320 K). As also demonstrated in FIG. 11, the value of the Bragg shift of this PMMA-coated fiber is expected to be approximately three times (3x) the amount of the Bragg shift of the Al-coated FBG and eleven times (11x) the shift of a bare FBG. As shown in FIG. 11, at twenty Kelvin (20 K), the temperature sensitivity of the PMMA-coated fiber is expected to be 8.13 pm/K. Using a detection system capable of one picometer (1 pm) resolution, a temperature resolution of 0.12 K at twenty Kelvin (20 K) would be expected for the PMMA-coated fiber.

FIG. 8 shows an expected peak wavelength shift in response to temperature variations for a PMMA-bonded sensor having a disbonding defect. It is expected that inducing strain immediately after PMMA bonding, with solvent still trapped inside the PMMA/fiber interface, would lead to an unstable bonding, thereby demonstrating the importance of single-layer contact between a fiber and its coating. An annealing process would be expected to stablize the adhesion of the coating to the sensor.

2. Thickness Optimization.

It would be expected that as the coating thickness was increased, the resulting strain on the fiber would reach a saturation point after which increasing the thickness of the coating would have little effect on strain. This saturation point could be used to determine the minimum coating thickness. As an example, the expected strain vs. thickness plot of an Al-coated fiber at twenty Kelvin (20 K) shows that the strain saturation will occur at a thickness of approximately three times (3x) times the radius of the fiber, while the expected plot for a PMMA-coated fiber shows that the saturation point is approximately eleven times (11x) times the radius of the fiber. See FIGS. 12, 13, 17 and 18. Thus, the optimum aluminum coating thickness for a fiber having radius of 62.5 $\mu$m is expected to be 187.5 $\mu$m, which would be expected to generate 255 microstrain. The optimum PMMA coating thickness for a fiber having a radius of 62.5 $\mu$m is expected to be 687.5 $\mu$m, which would be expected to generate 3336 microstrain. As summarized in the table shown in FIG. 19, appreciable increases in coating thickness would not significantly increase strain sensitivity in the invention. Consequently, the strain expected to be generated by the PMMA-coated fiber is approximately thirteen times (13x) the strain produced by the Al-coated fiber at saturation.

C. Conclusion

The transducer design of the present invention is suitable for ascertaining cryogenic temperature changes, particularly when direct temperature measurement is required to be made in the presence of a strong electromagnetic field or in an explosive environment, as the invention is optical and not directly electrical. For example, the invention facilitates proper temperature maintenance in accelerators in the U.S. and worldwide that use superconducting magnets and cavities that require temperature monitoring in presence of electromagnetic fields. Temperature monitoring using the method of the present invention is suitable for magnetic resonance imaging ("MRI") systems used in hospitals and industrial applications that require superconducting magnets. In addition, the invention is useful for continuous monitoring of magnetic levitation rail systems that employ cryogenic cooling. Magneto-hydrodynamic ("MHD") power generation and propulsion systems that employ superconducting coils that require temperature monitoring will also find the invention useful. Furthermore, superconducting magnets required for tokamaks and inertial confinement systems can successfully use the proposed temperature sensor. Additionally, the invention allows for measurement of cryogenic temperatures that are suitable for nondestructive evaluation ("NDE") of material properties and structural integrity. The invention can also be used to enhance the high temperature sensitivity of fiber grating sensors.

Consequently, it has been shown that a device has been invented that allows sensitive measurement of changes in temperature at very low absolute temperature levels. Additionally, the invention allows temperature changes to be measured in the presence of strong electromagnetic fields and in explosive environments. Also, the invention allows detection of low temperature changes across a distributed area. Moreover, because the device of the present invention has a single layer coating and because the coating itself is very flexible or located only in a very small region of an optical fiber, an optical fiber device has been invented that allows cryogenic temperature measurement that is very accurate, easy to calibrate and use, and allows the fiber to remain flexible.

It should be understood that the described embodiments merely illustrate principles of the invention. Many modifications, additions and deletions may be made without departure from the description provided. For example, as illustrated in FIGS. 21, 22 and 23, a coated fiber grating could be used in conjunction with an uncoated grating to provide temperature referencing in environments where changes in refractive index occur that are dependent with temperature. Such an arrangement of coated and uncoated sensors could be performed, as illustrated, in the same fiber. Furthermore, removal of a portion of the cladding of the fiber carrying the uncoated grating could allow changes in the refractive index of the medium in which such a transducer is placed to alter the transmissive and reflective characteristics of the fiber. As a result, combining such an uncoated grating in the same fiber, or even in close proximity to, a coated grating, would create an apparatus that operates as a level detector, as shown in FIG. 23 or a chemical-monitor sensor, as shown in FIGS. 21 and 22, with fluctuations in temperature being duly compensated for.

What is claimed is:

1. An optical fiber temperature transducer, the optical fiber for carrying an optical signal,
    the optical fiber having:
        a length,
        a thermal expansion coefficient,
        at least one core and
        at least one cladding,
    the transducer further comprising:
        a grating associated with the core of the optical fiber at a location along the length of the optical fiber, the grating for selectively altering portions of the signal carried by the optical fiber; and
        a coating integrated with the cladding at the location, the coating for increasing the sensitivity of the transducer to changes in temperature at the location, the coating having a thermal expansion coefficient that is larger than the thermal expansion coefficient of the optical fiber.

2. The optical fiber temperature transducer of claim 1 wherein the grating is a long period grating.

3. The optical fiber temperature transducer of claim 2 wherein the coating is aluminum.

4. The optical fiber temperature transducer of claim 3 wherein the aluminum is sputter deposited.

5. The optical fiber temperature transducer of claim 2 wherein the coating is polymethyl methacrylate.

6. The optical fiber temperature transducer of claim 5 wherein the polymethyl methacrylate is integrated by polymerization.

7. The optical fiber temperature transducer of claim 1 wherein the grating is a Bragg grating.

8. The optical fiber temperature transducer of claim 7 wherein the coating is aluminum.

9. The optical fiber temperature transducer of claim 8 wherein the aluminum is sputter deposited.

10. The optical fiber temperature transducer of claim 7 wherein the coating is polymethyl methacrylate.

11. The optical fiber temperature transducer of claim 10 wherein the polymethyl methacrylate is integrated by polymerization.

12. The optical fiber temperature transducer of claim 7 wherein:
    the optical fiber has an end, and
    the location at which the grating is associated with the optical fiber is at the end of the optical fiber.

13. A temperature-referenced, chemical-monitoring transducer comprising:
    a chemical-monitor sensor, the chemical-monitor sensor for detecting changes in refractive index of a chemical, the chemical-monitor sensor having:
        a first optical fiber, the first optical fiber for carrying a first optical signal, the first optical fiber having:
            a thermal expansion coefficient and
            at least one core,
        the first optical fiber further comprising:
            a first grating associated with the core of the first optical fiber of the chemical-monitor sensor at a location along the first optical fiber, the first grating of the first optical fiber for selectively altering the first signal, and
            a total internal reflection reducer, the total internal reflection reducer for reducing the amount of first signal subject to total internal reflection within the core of the first optical fiber; and
    the temperature-referenced, chemical-monitoring transducer further comprising a temperature-reference sensor for providing signal regarding temperature changes associated with the chemical, the temperature-reference sensor having:
        a second optical fiber, the second optical fiber for carrying a second optical signal, the second optical fiber having:
            a length,
            a thermal expansion coefficient, and
            at least one core and
            at least one cladding,
        the second optical fiber further comprising:
            a second grating associated with the core of the second optical fiber at a location along the length of the second optical fiber, the second grating for selectively altering the second signal; and
            a coating integrated with the cladding at the location, the coating for increasing the sensitivity of the temperature-reference sensor to changes in temperature at the location, the coating having a thermal expansion coefficient that is larger than the thermal expansion coefficient of the second optical fiber,
    whereby, when the chemical-monitoring sensor and the temperature-reference sensor are in proximity to each other and when the chemical-monitoring sensor and the temperature-reference sensor are in the presence of the chemical, changes in refractive index of the chemical can cause a change in the first signal which is compensable by a change in the second signal.

14. The temperature-referenced, chemical-monitoring transducer of claim 13 wherein the first grating is a Bragg grating and wherein the second grating is a Bragg grating.

15. The temperature-referenced, chemical-monitoring transducer of claim 13 wherein the coating is aluminum.

16. The temperature-referenced, chemical-monitoring transducer of claim 15 wherein the aluminum is sputter deposited.

17. The temperature-referenced, chemical-monitoring transducer of claim 13 wherein the coating is polymethyl methacrylate.

18. The temperature-referenced, chemical-monitoring transducer of claim 17 wherein the polymethyl methacrylate is integrated by polymerization.

19. The temperature-referenced, chemical-monitoring transducer of claim 13 wherein:
    the first optical fiber has an end, and
    the location at which the first grating is associated with the first optical fiber is at the end of the first optical fiber.

20. The temperature-referenced, chemical-monitoring transducer of claim 13 wherein the first optical fiber and the second optical fiber are the same fiber.

21. The temperature-referenced, chemical-monitoring transducer of claim 13 wherein the cladding of the first optical fiber has a thickness and the total internal reflection reducer comprises a decrease in thickness of the cladding of the first optical fiber at the location, relative to the thickness elsewhere in the cladding of the first optical fiber.

22. The temperature-referenced, chemical-monitoring transducer of claim 21 wherein the decreased cladding thickness of the first optical fiber is formed by etching with hydrofluoric acid.

23. The temperature-referenced, chemical-monitoring transducer of claim 13 wherein the cladding of the first optical fiber has in index of refraction and the total internal reflection reducer comprises an increased index of refraction of the cladding of the first optical fiber at the location, relative to the index of refraction of the cladding elsewhere in the cladding of the first optical fiber.

24. The temperature-referenced, chemical-monitoring transducer of claim 13 wherein the core of the first optical fiber has an index of refraction and the total internal reflection reducer comprises a decreased index of refraction of the core of the first optical fiber at the location, relative to the index of refraction elsewhere in the core of the first optical fiber.

25. The temperature-referenced, chemical-monitoring transducer of claim 13 wherein the transducer is a level sensor.

26. The temperature-referenced, chemical-monitoring transducer of claim 13 wherein the transducer is a depth sensor.

27. The temperature-referenced, chemical-monitoring transducer of claim 13 wherein the transducer is a fluid density sensor.

28. A process for making an optical fiber temperature transducer, the optical fiber for carrying an optical signal, the optical fiber having:
a length,
a thermal expansion coefficient, and
at least one core and
at least one cladding,
the process comprising the steps of:
associating a grating with the core of the optical fiber at a location along the length of the optical fiber, the grating for selectively altering portions of the signal carried by the optical fiber; and
integrating a coating with the cladding at the location, the coating for increasing the sensitivity of the transducer to changes in temperature at the location, the coating having a thermal expansion coefficient that is larger than the thermal expansion coefficient of the optical fiber.

29. The process of claim 28 wherein the grating of the associating step is a long period grating.

30. The process of claim 29 wherein the coating of the integrating step is aluminum.

31. The process of claim 30 wherein the integrating step comprises sputter depositing aluminum.

32. The process of claim 29 wherein the coating of the integrating step is polymethyl methacrylate.

33. The process of claim 32 wherein the integrating step comprises polymerizing the polymethyl methacrylate.

34. A transducer made according to the process of claim 29.

35. The transducer of claim 34 wherein the integrated coating is polymerized polymethyl methacrylate.

36. The process of claim 28 wherein the grating of the associating step is a Bragg grating.

37. The process of claim 36 wherein the coating of the integrating step is aluminum.

38. The process of claim 37 wherein the integrating step comprises sputter depositing aluminum.

39. The process of claim 36 wherein the coating of the integrating step is polymethyl methacrylate.

40. The process of claim 39 wherein the integrating step comprises polymerizing the polymethyl methacrylate.

41. The process of claim 36 wherein:
the optical fiber has an end, and
the location of the grating of the associating step is at the end of the optical fiber.

42. A transducer made according to the process of claim 36.

43. The transducer of claim 42 wherein the integrated coating is polymerized polymethyl methacrylate.

44. A process of making a temperature-referenced, chemical-monitoring transducer comprising the steps of:
fabricating a chemical-monitor sensor, the chemical-monitor sensor for detecting changes in refractive index of a chemical, the chemical-monitor sensor having:
a first optical fiber, the first optical fiber for carrying a first optical signal, the first optical fiber having:
a thermal expansion coefficient and
at least one core,
the chemical-monitor sensor made according to a process comprising the steps of:
associating a first grating with the core of the first optical fiber of the chemical-monitor sensor at a location along the first optical fiber, the first grating of the first optical fiber for selectively altering the first signal, and
reducing the amount of optical signal subject to total internal reflection within the core of the first optical fiber; and
the process of making a temperature-referenced, chemical-monitoring transducer further comprising the steps of fabricating a temperature-reference sensor for providing signal regarding temperature changes associated with the chemical, the temperature-reference sensor having:
a second optical fiber, the second optical fiber for carrying a second optical signal, the second optical fiber having:
a length,
a thermal expansion coefficient, and
at least one core and
at least one cladding,
the temperature-reference sensor made according to a process comprising the steps of:
associating a second grating with the core of the second optical fiber at a location along the length of the second optical fiber, the second grating for selectively altering the second signal carried by the second optical fiber; and
integrating a coating with the cladding at the location, the coating for increasing the sensitivity of the temperature-reference sensor to changes in temperature at the location, the coating having a thermal expansion coefficient that is larger than the thermal expansion coefficient of the second optical fiber,
whereby, when the chemical-monitor sensor and the temperature-reference sensor are in proximity to each other and when the chemical-monitor sensor and the temperature-reference sensor are in the presence of the chemical, changes in refractive index of the chemical can cause a change in the first signal which will be compensable by a change in the second signal.

45. The process of claim 44 wherein the first grating of the chemical-monitor fabricating step is a Bragg grating and wherein the second grating of the temperature-reference fabricating step is a Bragg grating.

46. The process of claim 44 wherein the coating of the integrating step is aluminum.

47. The process of claim 46 wherein the integrating step comprises the step of sputter depositing aluminum.

48. The process of claim 44 wherein the coating of the integrating step is polymethyl methacrylate.

49. The process of claim 48 wherein the integrating step comprises the step of polymerizing polymethyl methacrylate.

50. The process of claim 44 wherein:

the first optical fiber has an end, and the location at which the first grating is associated with the first optical fiber is at the end of the first optical fiber.

51. The process of claim 44 wherein the first optical fiber of the chemical-monitor fabricating step and the second optical fiber of the temperature-reference fabricating step are the same fiber.

52. The process of claim 44 wherein the reducing total internal reflection step of the chemical-monitor sensor fabricating step comprises the step of decreasing thickness of the cladding at the location, relative to the thickness of the cladding elsewhere in the first optical fiber.

53. The process of claim 52 wherein the decreasing thickness step comprises the step of etching the cladding of the first optical fiber with hydrofluoric acid.

54. The process of claim 44 wherein the reducing total internal reflection step of the chemical-monitor sensor fabricating step comprises the step of increasing the index of refraction of the cladding at the location, relative to the index of refraction of the cladding elsewhere in the first optical fiber.

55. The process of claim 44 wherein the reducing total internal reflection step of the chemical-monitor sensor fabricating step comprises the step of decreasing the index of refraction of the core at the location, relative to the index of refraction of the core elsewhere in the first optical fiber.

56. A transducer made in accordance with the process of claim 44.

57. The transducer of claim 56 wherein the transducer is a level sensor.

58. The transducer of claim 56 wherein the transducer is a depth sensor.

59. The transducer of claim 56 wherein the transducer is a fluid density sensor.

60. The temperature-referenced, chemical-monitoring transducer of claim 20 wherein a plurality of chemical-monitor sensors and a plurality of associated temperature-reference sensors are on a single fiber for distributed measurement on the same fiber.

61. The temperature-referenced, chemical-monitoring transducer of claim 60 wherein the wavelength of each grating of each sensor is different, for allowing the distinguishing of transduction occurring at particular locations on the fiber.

62. The process of claim 51 wherein the chemical-monitor sensor fabricating step comprises fabricating a plurality of chemical-monitor sensors on the fiber and the temperature-reference sensor fabricating step comprises fabricating a plurality of associated temperature-reference sensors on the fiber, for distributed measurement on the same fiber.

63. The process of claim 62 wherein the wavelength of each grating of each sensor of each fabricating step is different, for allowing distinguishing of transduction occurring at particular locations on the same fiber.

64. The transducer of claim 1 wherein the coating thickness is optimized.

65. The process of claim 28 wherein the integrating step comprises optimizing the coating thickness.

* * * * *

UNITED STATES PATENT AND TRADEMARK OFFICE
CERTIFICATE OF CORRECTION

PATENT NO.   : 6,072,922
DATED        : June 6, 2000
INVENTOR(S)  : Albin et al.

It is certified that error appears in the above-identified patent and that said Letters Patent is hereby corrected as shown below:

Column 1,
Line 3, insert -- This invetion was made with Government support under Contract NAS1-97150 awarded by NASA. The Government has certain rights in this invention. --.

Signed and Sealed this

Sixth Day of December, 2005

JON W. DUDAS
*Director of the United States Patent and Trademark Office*